United States Patent [19]
Leland et al.

[11] Patent Number: 4,773,015
[45] Date of Patent: Sep. 20, 1988

[54] METHOD AND APPARATUS FOR ONBOARD MONITORING OF AIRCRAFT TAKEOFF

[75] Inventors: James W. Leland, San Antonio; James E. Kirkpatrick, Canyon Lake, both of Tex.

[73] Assignee: Accutold, San Antonio, Tex.

[21] Appl. No.: 698,866

[22] Filed: Feb. 6, 1985

[51] Int. Cl.⁴ .................... G01C 21/00; G06F 15/50
[52] U.S. Cl. ................................ 364/427; 73/178 T; 340/972
[58] Field of Search .................. 364/427, 561, 426; 73/178 T; 340/972; 244/183

[56] References Cited

U.S. PATENT DOCUMENTS

| | | | |
|---|---|---|---|
| 3,034,096 | 5/1962 | Craddock | 364/427 X |
| 3,048,329 | 8/1962 | Berggren | 364/427 X |
| 3,128,445 | 4/1964 | Hosford | 364/427 X |
| 3,159,738 | 12/1964 | James et al. | 364/427 |
| 3,205,707 | 9/1965 | Richter | 73/178 T |
| 3,368,065 | 2/1968 | Kendall | 364/427 |
| 3,504,335 | 3/1970 | Hall et al. | 364/427 |
| 3,865,071 | 2/1975 | Manor | 73/178 T |
| 4,122,522 | 2/1978 | Smith | 364/427 |
| 4,454,582 | 6/1984 | Cleary et al. | 364/427 |

OTHER PUBLICATIONS

Snodgrass, "Takeoff Aids to Pilots" Skyways, Oct. 1957, pp. 21, 89–91.

Fusca, "Takeoff Monitor Computes Runway Roll", Aviation Week, Oct. 13, 1958, pp. 99–104.

Primary Examiner—Parshotam S. Lall
Assistant Examiner—Thomas G. Black
Attorney, Agent, or Firm—Gunn, Lee & Jackson

[57] ABSTRACT

An aircraft takeoff monitor having distance traveled sensors for measuring the distance traveled after the initiation of the takeoff roll. These sensors are interfaced with an onboard computer to provide the computer with information on the actual distance traveled by the aircraft since the takeoff run was initiated. The computer is programmable to receive predetermined input signals, including runway length, real-time inputs, and the initiation time, with the computer constantly generating a predicted ground distance that should be traveled since the initiation of the takeoff run. The computer is further programmed to compare the actual ground distance traveled to the predicted ground distance which should have been traveled and provide a display signal representative of this comparison on an onboard display instrument. Simultaneously the computer further continuously computes a predicted stopping distance for the aircraft at any time after the initiation of takeoff, adding the actual distance traveled to the predicted stopping distance, and subtracting these additive distances from the runway length, thereby generating a stopping distance display signal which is displayed on the onboard display instrument to indicate the distance the aircraft would predictably stop from the end of the runway.

12 Claims, 2 Drawing Sheets

METHOD AND APPARATUS FOR ONBOARD MONITORING OF AIRCRAFT TAKEOFF

BACKGROUND OF THE INVENTION

This invention relates to an aircraft takeoff monitor and relates more particularly to the method and means for displaying the aircraft takeoff and stopping status to the aircraft pilot. The apparatus and method are supplements to existing onboard monitors.

Several monitoring systems, devices, and techniques are currently disclosed to monitor the performance of an airplane during takeoff. However, they generally involve complicated sensing devices, a multiplicity of computing elements, and/or elaborate visual displays, all combining to yield devices which only add to the cockpit confusion during takeoff. The prior art devices do not provide the pilot with a simple, easy to read indication of when the aircraft is not performing as predicted. None of the prior art devices indicate how the rate at which the takeoff conditions are deteriorating nor the rate at which the aircraft is running out of stopping distance on a given runway.

U.S. Pat. No. 3,048,329 to L. E. Berggren discloses the typical orientation of most of the prior art devices. This patent discloses a cockpit instrument panel which tells the pilot where his aircraft is with respect to a point designated as a point of no return. When submarginal acceleration is experienced, the instrument panel automatically results in an abort signal, if the aircraft is not past the point of no return. If the actual acceleration is less than a selected minimum, the abort signal is generated provided that the distance measured from the end of the runway is not greater than that computed for the point of no return. There is no simple indicator indicating how close the aircraft would stop to the end of the runway if the brakes were applied.

U.S. Pat. No. 3,205,707 to H. K. Richter also discloses a performance monitor, but the Richter device is designed for a particular aircraft and does not incorporate a means for adjusting for a number of takeoff variables, except altitude. An altitude compensator, forming a part of the performance meter, automatically adjusts the device via a variable potentiometer, for takeoff pressure conditions actually existing at the time.

U.S. Pat. No. 3,368,065 issued to E. R. Kendall discloses an aircraft instrument which indicates (1) the actual distance traveled during the ground run, and (2) the extra distance that needs to be traveled to attain a velocity increase. The pilot is thereby provided with a visual indication of the acceleration performance of the aircraft and can thus detect when it is subnormal. However, nothing indicates how rapidly conditions are deteriorating. The Kendall specification discloses a rather complex four region display area with an index driven across it to show progress along the runway.

Nearly all of the prior art devices focus on a calculated air speed ($V_l$). Below this speed, a multi-engined aircraft may be safely stopped on the remaining runway, but cannot safely continue takeoff if an engine fails. Above this speed, the takeoff is committed, no stop is possible, but if an engine fails, the airplane can safely become airborne. This V1 speed is determined from FAA required data provided by the airplane manufacturer. It must be determined for each individual takeoff, based on the specific conditions existing at the time of takeoff. The V1 speed depends on the following variables: airplane weight, runway altitude, runway length, runway gradient, air temperature, and the wind velocity component in the direction of takeoff.

There is a serious deficiency, however, in this manner of operation. The reliance on V1 for takeoff safety is based upon "normal" performance of the airplane. Usually this is the minimum performance that can be expected, so there is some margin for error most of the time. If this margin becomes negative and an engine failure occurs, an accident can be expected.

In present practice with the existing takeoff monitoring devices, the pilot has the option of aborting a takeoff at any time the air speed is below the V1 speed determined for that particular takeoff. This is supposed to assure that there is sufficient runway to stop. However, this is only true if the airplane started the takeoff at the prescribed place on a runway, and the airplane performs "normally" for the entire time of the takeoff. If there is a slight performance degradation and V1 is not reached, it is probable that a takeoff can continue, but there is no assurance that the airplane can be stopped on the remaining runway. In extreme cases, where performance is so degraded that the airplane cannot safely become airborne, there is obviously no possibility of stopping if the takeoff run is continued too far in an attempt to reach V1.

The assumption that the airplane can be stopped on the runway at any speed below V1 is erroneous and dangerous because it is only true for a "normal" takeoff. For an "abnormal" takeoff, there is no assurance that the plane can be stopped on a runway, even though the air speed is below V1.

The present invention provides additional information to the crew to help them assure safety during the entire takeoff. With this additional information, they can then determine whether the airplane is proceeding "normally" along the takeoff path and whether there is sufficient runway left to stop. The invention actually indicates when the airplane is not performing "normally" and how far behind a "normal" takeoff the airplane actually is. The rate of change of the display indicates how rapidly the aircraft is falling behind.

The present invention thus provides the information needed by the crew to make an informed decision, requiring the least amount of interpretation, and in the shortest possible time. It does this by displaying to the crew the takeoff and stopping status at all times from the start of the takeoff until lift-off. The takeoff status display shows continuously how many feet, if any, the airplane is behind "normal" takeoff distance. The stopping status display of the present invention shows how many feet of runway would remain (stopping margin), if the takeoff were aborted with less than some arbitrary margin, say 1,000 feet. This, in effect, gives an anticipatory warning that the possibility of stopping on the runway will soon be passed. The present invention further provides a flashing display signal when the aircraft cannot be stopped on the remaining runway length.

SUMMARY OF THE INVENTION

The apparatus and method of this invention determines by an onboard computer the takeoff status by continuously predicting how far the airplane should have traveled if it were performing "normally" and compares this to the actual distance the airplane has traveled. The actual distance traveled is detected by one or more onboard sensors and fed to the computer. The computer predicts the distance the airplane should have traveled using stored values for the specific airplane type and data input by the crew before the start of the takeoff. These inputs include: airplane weight, runway altitude, runway gradient, ambient air temperature, wind velocity, and the start time of the takeoff. Engine thrust values and other specific values stored in the ROM for the airplane type are used by the computer along with the key pad input values to determine the airplane thrust and drag continuously during the takeoff run. The results of these comparisons are updated on the display several times per second.

The computer also determines the stopping status from stored values and crew inputs of weight, altitude, runway gradient, runway length, ambient temperature, and wind velocity. The computer continually determines the distance required to stop from the instantaneous speed at any time, using inputs from the distance traveled sensor or sensors. The computer then adds the runway distance already used and a distance that would result from a three second reaction and delay time. This value is subtracted from the runway length to give the stopping margin. When the stopping margin is less than some arbitrary value, say 1,000 feet, the value is shown on the stopping status display. When the stopping margin becomes zero, an additional warning is given, i.e., a flashing of the display. Stopping margins and delay times and other values stored in ROM may be varied as required for different types of aircrafts.

DETAILED DESCRIPTION OF THE PREFERRED EMBODIMENT

Figure 1:
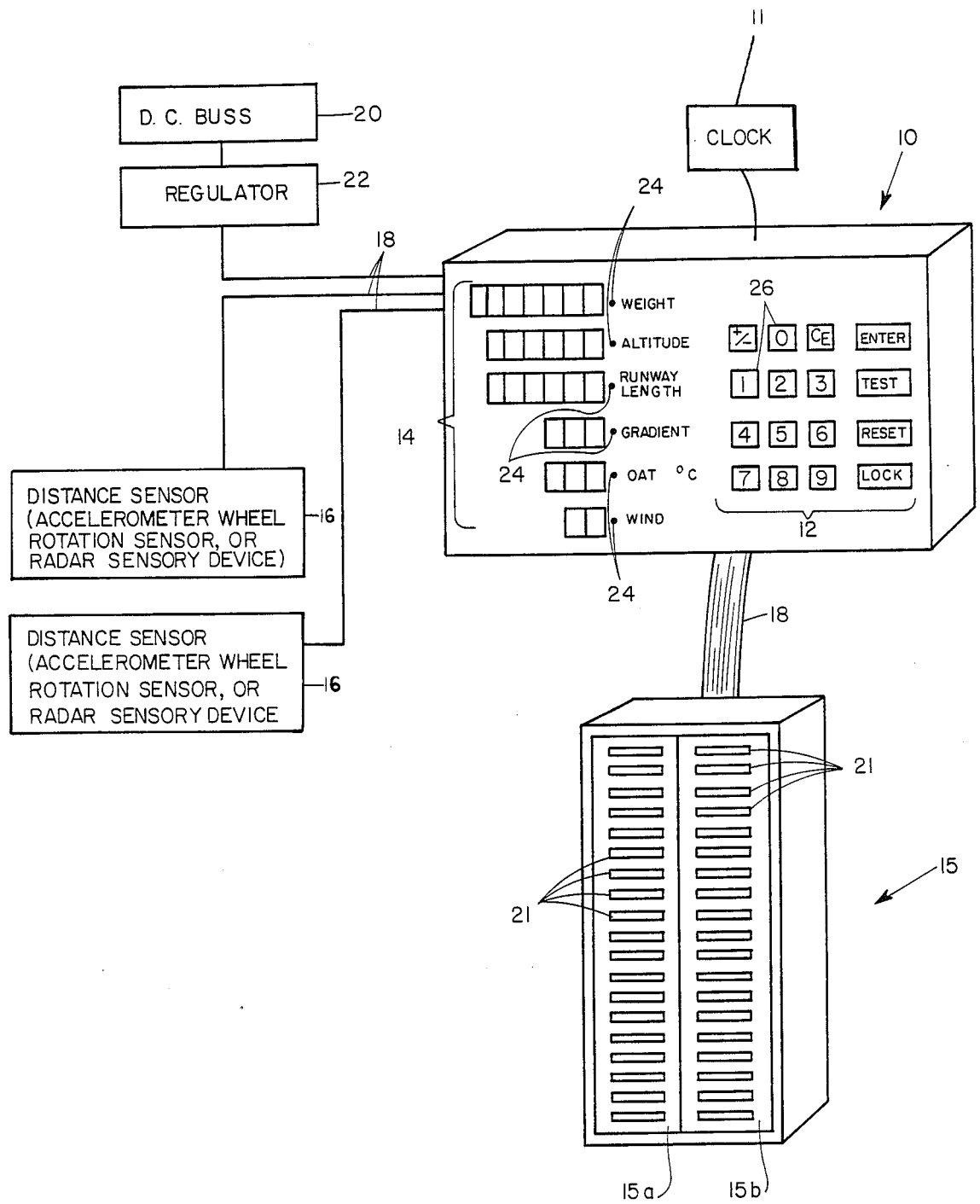
FIG. 1 is a block diagram of the apparatus of the invention also showing a front view of the computer display of the invention.

FIG. 1 is a block diagram showing the basic hardware and interfaces of the invention. The invention consists of a computer 10 having a data input key pad 12, a data input display 14, a takeoff and stop status bar display 15, one or more distance traveled sensors 16, and interconnecting cables 18. Electrical power is supplied to the invention via the aircraft's DC bus 20. The bus voltage is reduced and regulated by a 5 volt integrated circuit regulator 22 before it is supplied to the computer 10. Input power is filtered on the computer circuit board (not shown) to reduce transients, as is commonly known in the art.

The computer 10 consists in the preferred embodiment of a Motorola Model 68705P3 microcomputer or similar units installed on a printed circuit board with connections to a crystal controlled time base 11, power supply, data inputs, and data outputs. This microcomputer has built-in read/write memory (RAM), read only memory (ROM), and input/output (I/O) capability, so that the only additional chips that are required are for the input value display 14, the takeoff and stop status display 15 and the sensors 16. The system operation is controlled by the onboard read only memory (ROM).

Data input Key pad 12 is a 16-key key pad arranged in a 4×4 matrix. It is connected directly, without buffering, to one of the computer 10 input ports. Data inputs from the key pad are detected and decoded by the ROM program.

Data input into the computer 10 via the key pad 12 are displayed on a six-line seven-segment L.E.D. panel, data input display 14. Each data line displays only sufficient digits for that parameter. For example, weight displays six digits, permitting values up to 999,999 pounds, while wind is limited to two digits. The last three lines may display plus or minus values.

The active data line is indicated by an individual L.E.D. These are called line indicators 24. These indicate which parameter the key pad inputs will affect. Use of high intensity L.E.D.s has improved visibility of the displays both during day and night operations, even in direct sunlight.

Initial data values (stored values) contained in the ROM are displayed on the data input display 14 when power is first applied and upon reset.

The input data displays are driven by multiplexed output under control of the ROM. The segments are powered by a binary coded decimal (BDC) to seven-segment decoder connected without buffering to four of the computer output lines. The digits are selected by a 1 of 16 and a 1 of 8 decoder connected without buffering to five of the microcomputer output lines. The line display indicators 24 are included in the multiplexing, but are driven separately from the segments by a single transistor switch. The minus signs are also separately driven in the same manner. The decimal point in the runway gradient parameter line is powered continuously through a fixed resistor and is driven by an associated digit.

The takeoff and stop status bar display 15 indicates takeoff status 15a in yellow and stopping status 15b in red. The display is linear, i.e., each bar indicates an equal number of feet. When a value of fifty feet is used for each bar, a full scale becomes 1,000 feet. This full scale value may be adjusted for the particular aircraft type when the ROM is programmed.

The forty element display L.E.D.s 21 are driven by five addressable latches connected without buffering to ten of the computer output lines. These lines are shared with the seven segment output lines which are blanked when not active. Each addressable latch drives eight display bars, decoded from three of the output lines. Each of the five output lines enables one of the five addressable latches. The two other lines clear the display and turn ON and OFF individual bars as they are addressed.

Three types of distance sensors 16 may be used to input into the computer the distance the airplane travels on the runway. One is a wheel rotation sensor installed in or on the axle of one or more of the aircraft wheels. An optical, magnetic or other means (including the aircraft's anti-skid mechanism) is used to send a pulse to the computer one or more times for each revolution of the wheel. A comparator circuit is used to sharpen the input pulse to the computer and prevent multiple inputs from a slow rise-time output from the sensor 16.

The second method uses a moving base K-band radar. Pulses from the radar are input into the computer proportional to the speed of the aircraft mounted radar unit, i.e., the speed of the airplane. These pulses are used in a similar manner to the wheel pulses. The third method employs the use of an accelerometer aligned with the forward motion of the aircraft. The signal from the accelerometer is input to the computer from which it derives the speed and distance values actually experienced by the aircraft. The three methods require similar but separate firmware.

When power is first applied to the system, the seven-segment display will show initial values (stored values) for the input data, for example, maximum airplane weight, standard day temperature, zero wind, field altitude, and field runway length and gradient. These values may be whatever the operator specifies at the time of system installation and may not be changed from the keyboard. The initial values are stored in ROM and may be changed only by reprogramming the computer.

Data is input into the computer using key pad 12. Line indicator L.E.D.s 24 show which parameter is active for input. Data are entered for each parameter in turn, using the numerical keys 26 of key pad 12, then pressing the ENTER key. This stores the displayed value in RAM and shifts to the next line. If the ENTER key is depressed without entering a new value, the displayed value is retained; i.e., the displayed value is always the stored value. If an entry error is made, it may be corrected by using the CE key and entering the corrected value. The computer will accept only the maximum number of digits shown by the display for each parameter. Inputs made after the line is full are ignored. Again, the data stored in the computer 10 are that shown by the display 14. Negative values are entered by use of the +/- key. This key reverses the sign of the value for the last three lines only.

The RESET key is used to re-enter the stored values and set the computer 10 to accept input data. The TEST key may be used to check operation of the computer 10 and bar display 15. It causes the bar display 15 to flash the end-of-runway signal 15b.

When the pilot is ready to start the takeoff, with the correct data displayed on all lines, the LOCK key is pressed. The computer then makes a number of calculations and starts to predict the takeoff and stopping distances.

The predicted takeoff distance S at any given time is calculated from the following equations:

$$S = \Sigma v t$$

$$v = at$$

where v is ground speed at the given time interval and t is the length of the time interval. Time is measured directly from the internal clock. Ground speed is in turn a function of predicted acceleration a:

$$= \frac{T - D}{32.2 \times W}$$

where T is thrust, D is drag, and W is weight. Thrust is stored in the computer according to manufacturer specifications as a function of altitude, outside air temperature, and airspeed. Drag is also taken from ROM according to the specific airplane model, and is available from the airplane manufacturer as a function of ambient pressure and air speed. Weight is input directly by the pilot.

The predicted stopping distance is continually calculated by the computer using the same formulae given above, except that variable a is now deceleration, and is given by the equation:

$$\text{deceleration} = \frac{2T - D - 2\mu W + \mu L}{64.4 W}$$

ps where T, D, and W are as before, only T is now idle thrust, and L is lift. The Greek letter Mu ($\mu$) is the coefficient of friction. These parameters are input by the pilot, or are contained within ROM based on manufacturer's specifications. Pressing the LOCK key initiates the timer. As the airplane moves down the runway, the distance sensors 16 input the distance actually traveled by the aircraft into the computer 10. The computer compares the actual distance traveled to the distance it predicts the airplane should have traveled since the timer was started. If the actual distance is less than the predicted distance, the difference is shown on the yellow section 15a of the bar display 15. The bar display 15 is calibrated to signify fifty feet for each bar. Full scale with twenty bars is therefore 1,000 feet. If all twenty bars are lighted, the airplane is 1,000 feet behind the predicted takeoff path. These values are set at the time of installation and may be any value desired by the operator.

At the same time (actually milliseconds apart) that the computer is predicting the takeoff distance, it is also predicting the stopping distance. The distance traveled sensor inputs and the computer's crystal time base are used to compute the airplane's ground speed. The distance required to stop from that speed is then determined, the computer having been programmed with necessary data either from stored values or data input via the key pad 12. A reaction and delay time of three seconds before any action is taken by the crew is assumed, and the distance that the airplane would travel in those three seconds at the existing aircraft speed is added to the stopping distance. (The reaction and delay time interval may not be changed by the key pad 12, but may be changed by reprogramming the computer.) This distance is then subtracted from the runway length. The result is the stopping margin.

When the stopping margin becomes less than 1,000 feet, the value is displayed on the stopping status or red section 15b of bar display 15. The scale is the same as the takeoff section 15a and may be changed at the time of installation to the operator's specification. If the takeoff were aborted when the first bar lighted, the airplane would be expected to stop 1,000 feet from the end of the runway. When all twenty bars were lighted, the stop would be at the end of the runway. When the stopping margin becomes negative, it is no longer possible to stop on the runway. If this occurs, the display will flash as a warning and the computer discontinues its calculations.

By observing the rate at which the yellow takeoff status bar sections 15a are lighted, the operator is able to determine how rapidly he is falling behind the takeoff schedule. Additionally, by observing how rapidly the bars on the red section 15b of the bar display 15 are lighted, it is clearly and easily evident to the operator as to how quickly he is running out of stopping margin.

Figure 2:
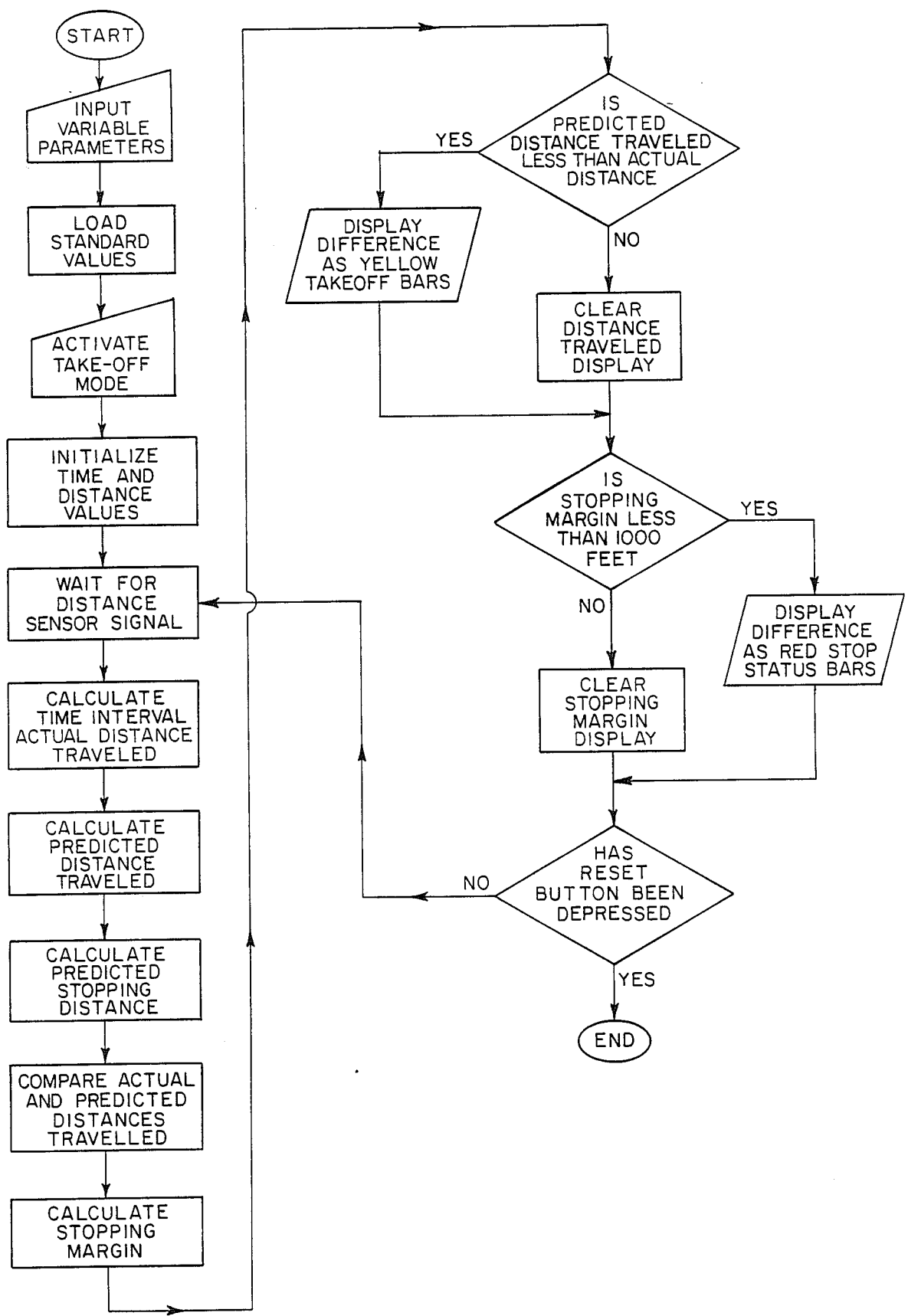
FIG. 2 is a flow chart depicting the steps performed in processing and displaying the data involved in the invention.

The method for monitoring the aircraft takeoff of the present invention can be envisioned as the steps of determining the aircraft's actual ground distance traveled after the initiation of the takeoff run. The steps are summarized in the flow chart of FIG. 2. This initiation time is indicated by pressing the LOCK key. From the predetermined inputs whether stored values or pilot key pad input, and real time inputs, (from distance sensors 16 and clock 11) the computer continuously computes a predicted ground distance that should be traveled by the aircraft after the initiation of the takeoff. As previously stated, the computer further calculates the distance required to stop the aircraft after the takeoff run has been initiated. There is a continuous comparing of the predicted ground distance to the actual ground distance traveled. Simultaneously, there is the continuous adding of the predicted stopping distance to the actual ground distance traveled and the subtracting of this additive distance (predicted stopping distance plus actual ground distance traveled) from the input runway length data. There is the continuous displaying within the cockpit on the bar display 15 whenever the actual ground distance traveled is less than the predicted ground distance such that the rate of increase of the illumination of individual bars indicates how rapidly the aircraft is falling behind in its takeoff. Further, there is the continuous displaying of the distance that the aircraft would predictably stop from the end of the runway; again, the rate of increase of such displaying indicates how rapidly the aircraft is running out of runway stopping distance.

While there have been shown and described and pointed out fundamental novel features of the invention as applied to the preferred embodiment, it will be understood that various omissions and substitutions and changes in the form and details of the invention illustrated may be made to by those skilled in the art without departing from the spirit of the invention. It is the intention, therefore, to be limited only as indicated by the scope of the claims appended hereto.

We claim:

1. An aircraft takeoff monitoring system comprising:
a first means for generating an actual ground distance traveled signal;
an onboard computer interfaced with said first means for processing predetermined and realtime input signals, including runway length, said computer continuously generating a predicted ground distance traveled signal;
said computer further programmed to continuously compare said actual ground distance traveled signal to said predicted ground distance traveled signal, said computer supplying a distance display signal representative of said comparison, said computer further still continuously computing a predicted stopping distance signal for said aircraft at any time, adding said actual ground distance traveled signal to said predicted stopping distance signal and subtracting said additive signals from said runway length input signal thereby generating a stopping display signal; and
an onboard display means responsive to said distance display signal and said stopping display signal for visually indicating a first difference between said actual ground distance traveled and said predicted ground distance traveled when said actual ground distance traveled is less than said predicted ground distance traveled, said display means further indicating a distance said aircraft would predictably stop from the end of said runway length.

2. The invention of claim 1 wherein said predetermined inputs comprise aircraft weight, altitude, runway gradient, ambient temperature, and wind velocity in direction of takeoff.

3. The invention of claim 1 wherein said predicted stopping distance signal is computed to allow for a predetermined reaction and delay time.

4. The invention of claim 1 wherein said first difference and said distance said aircraft would predictably stop from the end of said runway length are displayed in incremental linear units such that the rate at which said units are displayed is an indication of how rapidly said aircraft is falling behind in its takeoff and how rapidly said aircraft is running out of runway stopping distance.

5. The invention of claim 4 wherein said incremental linear units are displayed in a bar display calibrated to signify 50 feet for each increment, said bar display having a full scale of 20 increments or 1,000 feet.

6. The invention of claim 5 wherein after said full scale of either said first difference or said distance said aircraft would predictably stop from the end of said runway length is fully displayed, said full scale of said fully displayed scale flashes intermittently.

7. The invention of claim 6 wherein said first difference is displayed in a first color and said distance said aircraft would predictably stop from the end of said runway length is displayed in a second color.

8. An aircraft takeoff monitoring system comprising:
a first measuring device measuring aircraft actual ground distance traveled after an initiation time, said first measuring device for providing actual distance signals which are dependent upon said actual ground distance traveled after said initiation time;
an onboard computer interfaced with said first measuring device to receive said actual distance signals for processing predetermined and real-time input signals including runway length and said initiation time, said input signals and said time resulting in said computer continuously generating a predicted ground distance traveled after said initiation time signal;
said computer further programmed to continuously compare said actual ground distance signals to said predicted ground distance traveled after said initiation time signal, said computer supplying a distance display signal representative of said comparison, said computer further still continuously computing a predicted stopping distance signal for said aircraft at any time after said initiation time, adding said actual ground distance signals to said predicted stopping distance signal and subtracting said additive signals from said runway length input signal thereby generating a stopping display signal; and
an onboard display means responsive to said distance display signal and said stopping display signal for visually indicating a first difference between said actual ground distance traveled and said predicted ground distance traveled when said actual ground distance traveled is less than said predicted ground distance traveled, said display means further indicating a distance said aircraft would predictably stop from the end of said runway length.

9. A method for monitoring an aircraft takeoff comprising the steps of:
determining said aircraft's actual ground distance traveled after an initiation time;
computing from predetermined and real-time inputs a predicted ground distance traveled by said aircraft after said initiation time;
computing a predicted distance required to stop said aircraft after said initiation time;
continuously comparing said predicted ground distance to said actual ground distance;
continuously adding said predicted stopping distance to said actual ground distance and subtracting said additive distance from a predetermined runway length input; continuously displaying, whenever said actual ground distance traveled is less than said predicted ground distance, the difference between said actual ground distance and said predicted ground distance such that the rate of said displaying indicates how rapidly said aircraft is falling behind in its takeoff; and continuously displaying the distance said aircraft would predictably stop from the end of said runway length such that the rate of such displaying indicates how rapidly said aircraft is running out of runway stopping distance.

10. The method of claim 9 wherein said step for determining said aircraft's actual ground distance traveled after initiation time is accomplished by means of an accelerometer.

11. The method of claim 9 wherein said step for determining said aircraft's actual ground distance traveled after initiation time is accomplished by means of a wheel rotation sensor.

12. The method of claim 9 wherein said step for determining said aircraft's actual ground distance traveled after initiation time is accomplished by means of a radar sensing device.

* * * * *